United States Patent
Maranville et al.

(10) Patent No.: US 7,648,439 B2
(45) Date of Patent: *Jan. 19, 2010

(54) OPERATION OF ELECTRICALLY CONTROLLED TRANSMISSIONS AT LOWER TEMPERATURES

(75) Inventors: Clay Maranville, Ypsilanti, MI (US); Allan Gale, Livonia, MI (US); Larry Elie, Ypsilanti, MI (US); Philip Koneda, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 406 days.

This patent is subject to a terminal disclaimer.

(21) Appl. No.: 11/566,981

(22) Filed: Dec. 5, 2006

(65) Prior Publication Data

US 2008/0132380 A1    Jun. 5, 2008

(51) Int. Cl.
 *F16H 59/60* (2006.01)
 *F16H 59/62* (2006.01)
 *F16H 59/00* (2006.01)
(52) U.S. Cl. .......................... 477/98; 477/97
(58) Field of Classification Search .................. 477/72, 477/76, 97, 98
See application file for complete search history.

(56) References Cited

U.S. PATENT DOCUMENTS

| | | |
|---|---|---|
| 3,601,110 A | 8/1971 | Kamazuka |
| 3,999,525 A | 12/1976 | Stumpp et al. |
| 4,137,872 A | 2/1979 | Loflin |
| 4,373,697 A * | 2/1983 | Phelps .................. 251/129.05 |
| 4,779,489 A * | 10/1988 | Haley .......................... 477/98 |
| 4,886,032 A | 12/1989 | Asmus |
| 4,934,907 A | 6/1990 | Kröner |
| 5,121,730 A | 6/1992 | Ausman et al. |
| 5,138,905 A * | 8/1992 | Kouno ........................ 477/80 |
| 5,159,915 A | 11/1992 | Saito et al. |
| 5,201,341 A | 4/1993 | Saito et al. |
| 5,479,901 A | 1/1996 | Gibson et al. |
| 5,494,219 A | 2/1996 | Maley et al. |
| 5,752,308 A | 5/1998 | Maley et al. |
| 5,784,245 A * | 7/1998 | Moraghan et al. ........... 361/154 |
| 5,915,626 A | 6/1999 | Awarzamani et al. |
| 5,954,030 A | 9/1999 | Sturman et al. |
| 6,076,508 A | 6/2000 | Nakano |
| 6,192,868 B1 | 2/2001 | Barnes et al. |
| 6,257,499 B1 | 7/2001 | Sturman |
| 6,392,865 B1 | 5/2002 | Fochtman et al. |

(Continued)

FOREIGN PATENT DOCUMENTS

JP    11210873 A  *  8/1999

(Continued)

OTHER PUBLICATIONS

Machine translations of above JP documents.*

(Continued)

*Primary Examiner*—Tisha D Lewis
(74) *Attorney, Agent, or Firm*—Allan J. Lippa; Alleman Hall McCoy Russell & Tuttle LLP

(57) ABSTRACT

A system and method for controlling electromechanical valves operating in a transmission is presented. According to the method, transmission operation can be improved by heating the valves, at least during some conditions.

19 Claims, 4 Drawing Sheets

U.S. PATENT DOCUMENTS

| | | |
|---|---|---|
| 6,561,168 B2 | 5/2003 | Hokao et al. |
| 6,575,138 B2 | 6/2003 | Welch et al. |
| 6,799,559 B2 | 10/2004 | Mieny et al. |
| 6,820,856 B2 | 11/2004 | Grill |
| 6,993,424 B2 * | 1/2006 | Shim .......................... 701/51 |
| 2004/0011900 A1 | 1/2004 | Gebhardt et al. |
| 2004/0046043 A1 * | 3/2004 | Luedicke ..................... 239/88 |
| 2004/0112316 A1 | 6/2004 | Oleksiewicz |
| 2005/0263136 A1 | 12/2005 | Rigney |
| 2006/0064967 A1 | 3/2006 | Frank et al. |

FOREIGN PATENT DOCUMENTS

JP    2000179661 A  *  6/2000

OTHER PUBLICATIONS

Applicants' Admission of Prior Art.

U.S. PTO Office Action, Mailed: Sep. 13, 2007, U.S. Appl. No. 11/566,911.

* cited by examiner

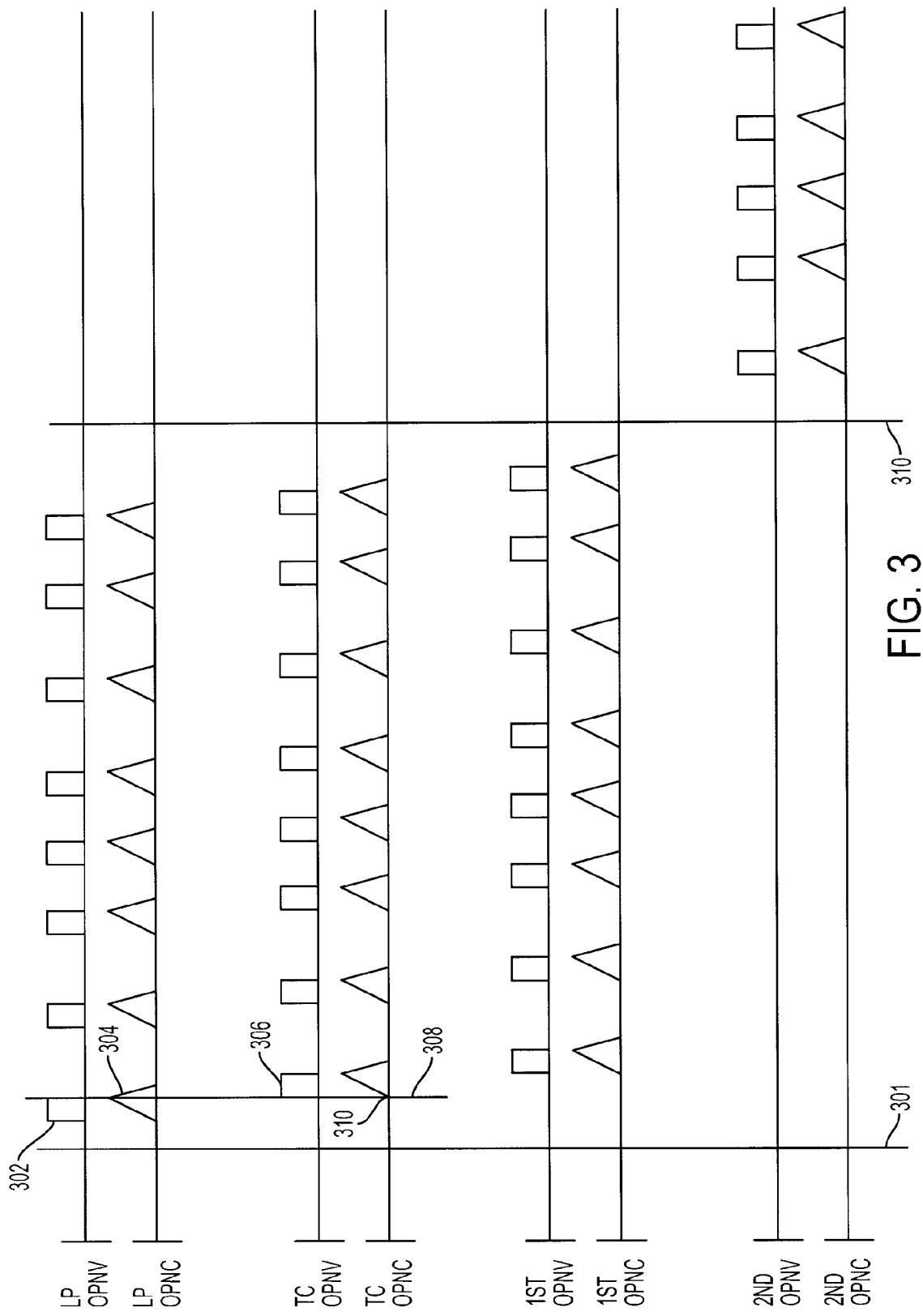

OPERATION OF ELECTRICALLY CONTROLLED TRANSMISSIONS AT LOWER TEMPERATURES

FIELD

The present description relates to a method for controlling electrically actuated valves operating in a transmission coupled to an internal combustion engine.

BACKGROUND AND SUMMARY

The performance of a transmission coupled to an internal combustion engine can be improved by using electrically actuating valves to control transmission torque converters and transmission shifting. For example, a torque converter locking clutch can be slipped at different rates to improve fuel economy and to reduce torque disturbances that a driver may feel when a transmission operates. Further, the pressure of transmission fluid that actuates transmission clutches can be controlled by an electrical actuator so that shift schedules may be varied and so that shift feel may be improved. However, at lower temperatures, frictional losses in electrically operable mechanically actuated valves can increase non-linearly, and additional electrical energy may be needed to operate a valve. As a result, shift feel may degrade and torque disturbances may be more noticeable to a driver. In addition, increased valve resistance can change valve response as well as the complexity of controlling a valve. This may be undesirable since valve performance uniformity is desired over a wide range of operating conditions.

One embodiment of the present description includes a method to improve the performance of an electrically actuated valve operable in a transmission, the method comprising: supplying a time-varying current to at least a coil of an electrically operable mechanical valve actuator that operates a valve of a transmission; said time-varying current increasing eddy currents as a temperature decreases; and said time-varying current decreasing said eddy currents as a temperature increases.

Shift performance can be improved and torque disturbances can be reduced by heating electrically operable mechanically actuated valves. In addition, valve heating can lower valve power consumption and improve valve operation, at least during some conditions by locally decreasing the viscosity of the control fluid. In one embodiment of the present description, a time-varying current may be passed through a coil of an electrically actuated mechanical valve to create a time-varying magnetic field. This field can induce eddy currents in nearby metal components (e.g., in the valve actuator armature and the coil end cap). The eddy currents can be transformed into thermal energy as their flow is restricted by the metal armature. This thermal energy can raise the temperature of transmission fluid that lubricates the actuator armature outer surface, thereby reducing the transmission fluid viscosity. Consequently, the amount of energy necessary to operate the valve can be reduced as the transmission fluid viscosity is lowered. In addition, valve heating can improve valve response and may make a valve respond more predictably.

The present description can provide several advantages. For example, the approach can be used to reduce the amount of power consumed by valves during valve state transitions. Also, the method can allow valves to be heated before an operator requests a vehicle start, which may improve shifting when the transmission is engaged. In addition, valves may be heated in a variety of ways so that a different heating method may be selected based on the geometry of an electrically operable mechanically actuated valve, for example. Further, in some embodiments, heating may be targeted to specific areas of an electrically operable mechanical valve actuator so that energy may be used more efficiently.

The above advantages and other advantages, and features of the present description will be readily apparent from the following Detailed Description when taken alone or in connection with the accompanying drawings.

BRIEF DESCRIPTION OF THE DRAWINGS

The advantages described herein will be more fully understood by reading an example of an embodiment, referred to herein as the Detailed Description, when taken alone or with reference to the drawings, wherein:

FIG. 3 is schematic diagram that shows a heating sequence for electrically operable mechanical valve actuators of a transmission.

DETAILED DESCRIPTION

Figure 1:
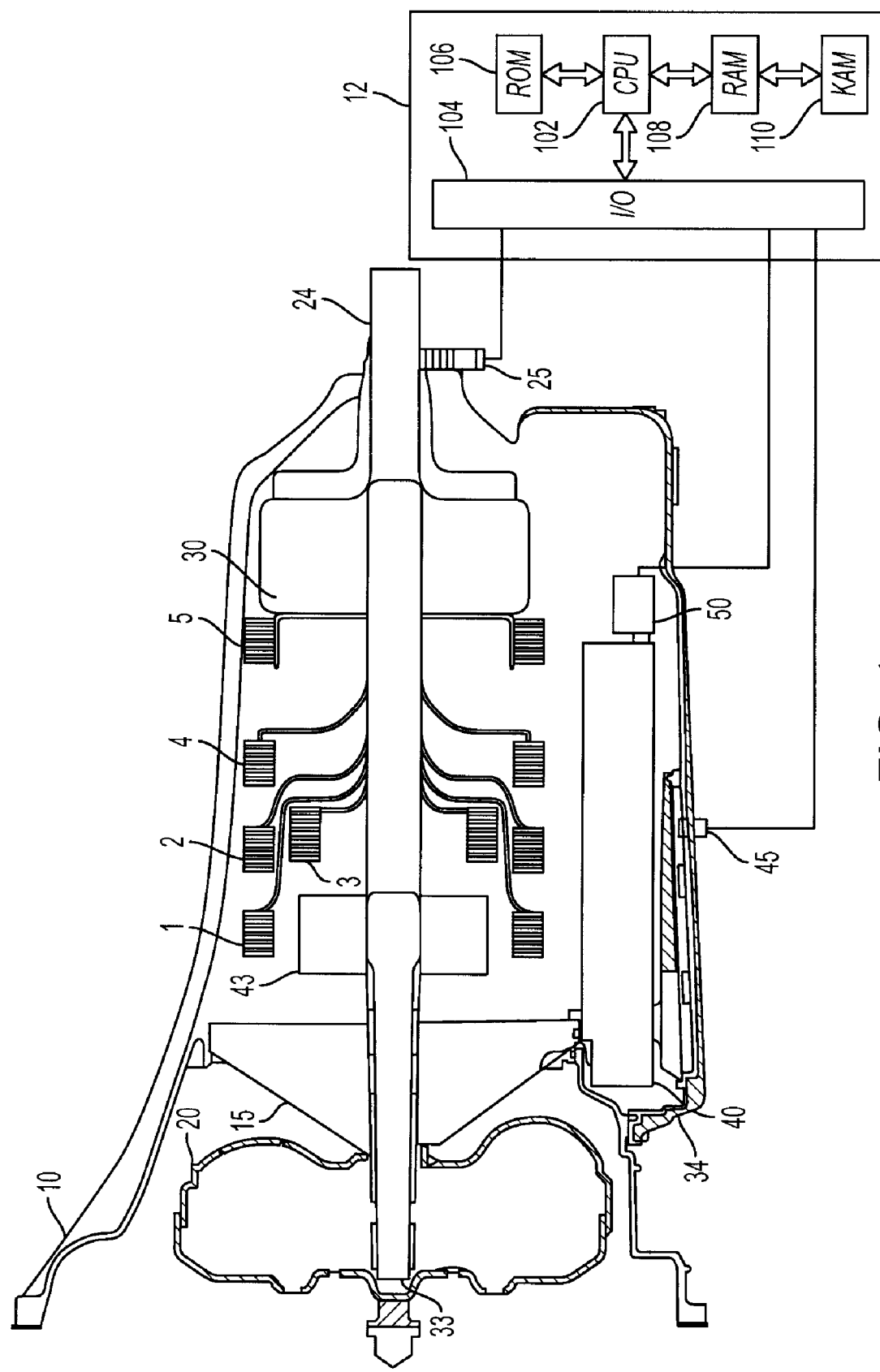
FIG. 1 is a schematic diagram of a transmission.

Referring to FIG. 1, a transmission 10, for managing power flow from an internal combustion engine to drive wheels of a vehicle is shown. Transmission operation is controlled by electronic controller 12. Transmission 10 includes torque converter 20 coupled to input shaft 33. Pump 15 pulls transmission fluid from pan 34 and is driven by input shaft 33 supplying pressurized fluid to torque converter 20 and to clutches 1-5 via valve body 40. Engine torque can be transferred from torque converter 20; through input shaft 33; through input gear set 43; through selected clutches 1-5; through output gear set 30; and to the output shaft 24. Spool valves (not shown) in the valve body are controlled by electrically operable mechanical valve 50, and by similar valves (not shown) to control transmission fluid pressure, control torque converter lock-up, and to apply clutches 1-5.

Controller 12 is shown in FIG. 1 as a conventional microcomputer including: microprocessor unit 102, input/output ports 104, and read-only-memory 106, random-access-memory 108, 110 Keep-alive-memory, and a conventional data bus. Controller 12 is shown receiving various signals from sensors coupled to transmission 10, including: transmission fluid temperature from temperature sensor 45 and transmission output speed from speed sensor 25. Control commands are sent from transmission controller 12 to electrically operable mechanical valve 50 and similar valves.

Figure 2A:
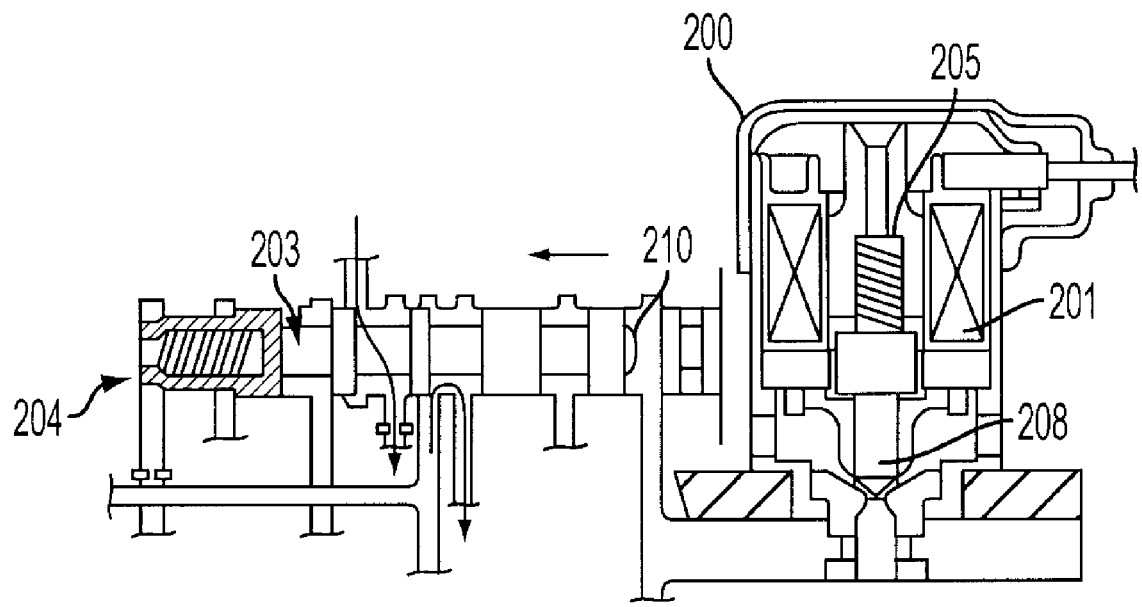
FIG. 2A is a schematic diagram that shows an electrically operable mechanical valve actuator in a closed state.

Referring now to FIG. 2A, a schematic of an example electrically operable mechanical valve actuator for a transmission is shown in the closed position. The transmission actuator 200 controls the flow of transmission fluid to a spool valve 203. The position of spool valve 203 is determined by return spring 204 and by the pressure that transmission fluid applies to the spool valve end 210. The transmission actuator is comprised of coil 201, return spring 205, and plunger/armature 208. The actuator is shown in the closed position where it is not excited by electrical current. Rather, the armature is held in position by return spring 205. When closed, the armature maintains transmission fluid pressure that has been applied to spool valve 203. The transmission fluid pressure compresses spring 204 and transmission fluid is allowed to flow by selected portions of spool valve 203. In the various valve configurations that are available, the routed transmission fluid can be used to actuate or release clutches or to regulate pump line pressure, for example.

Figure 2B:
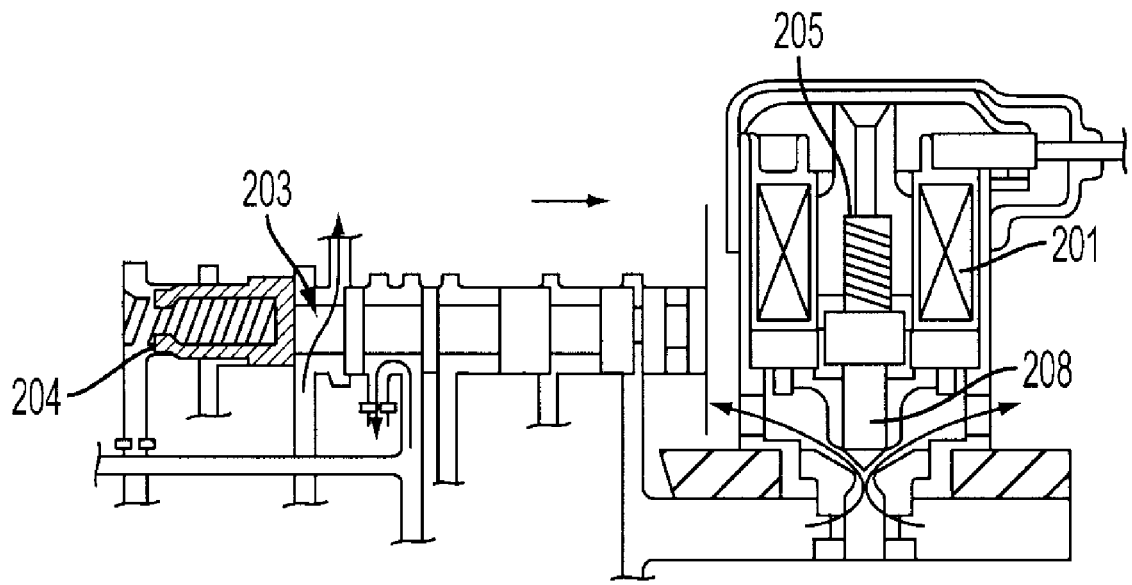
FIG. 2B is a schematic diagram that shows an electrically operable mechanical valve actuator in an open state.

Referring now to FIG. 2B, a schematic of an example electrically operable mechanical valve actuator for a transmission is shown in an open position. Spool valve 203 is shown in the returned position. Spool valve 203 assumes the returned position when electrical current draws armature 208 toward opening coil 201. When the armature moves to the opening magnet 201, transmission fluid is allowed to pass the electrically operable mechanical valve and the transmission fluid pressure is relieved, thereby returning the spool valve by way of spring 204.

Note that other embodiments of the present description anticipate normally open electrically actuated valves that are moved to a closed position when current flows to an armature closing coil. In addition, two coil electrically operable mechanically actuated transmission valves are also anticipated and can be heated in a similar manner as that which is described in FIG. 3. For example, the opening and closing coils of one transmission actuator may receive heating current before heating current is applied to another actuator.

In one embodiment, an electromechanical valve is comprised of an armature assembly and a coil 201. The armature assembly is comprised of an armature return spring 205 and an armature 208. In one embodiment, the electrically operable mechanical valve actuator natural frequency may be determined from the mechanical portion comprising the actuator armature 208 and return spring 205. While in other embodiments, the natural response may also include other components that are not shown in this example illustration. Therefore, the illustrations in the present description are not intended to limit the scope or breadth of the description.

Referring now to FIG. 3, a schematic diagram of an example transmission heating sequence for electrically operable mechanical valve actuators is shown. The figure illustrates a heating for four actuators are shown, but additional or fewer actuators may be heated, if desired. The heating sequence begins on the left side of the figure and propagates to the right side. Voltage and current delivered to each actuator are labeled at the left side of each signal sequence. Label LP OPNV identifies the line pressure control valve opening signal voltage. Label LP OPNC identifies the line pressure control valve current. Label TC OPNV identifies the transmission converter clutch valve opening signal voltage. Label TC OPNC identifies the transmission converter clutch valve current. Label $1^{st}$ OPNV identifies the $1^{st}$ gear valve opening signal voltage. Label $1^{st}$ OPNC identifies the $1^{st}$ gear valve current. Second gear control signals are labeled similar to $1^{st}$ gear control signals.

Vertical marker 301 identifies a key-on event or a similar event where a vehicle operator or system makes a request to start a vehicle. Vertical marker 310 indicates a transmission engagement from "Park" to "Drive" or from "Park" to "Reverse". Alternatively, a transmission can be engaged from "Neutral" to "Drive" or from "Neutral" to "Reverse." The region between reference 301 and reference 310 is an area where the engine may be immediately started or where the driver may delay starting for some period of time. Accordingly, the time between events at reference 301 and events at reference 310 can vary and is not intended to limit the scope or breadth of this disclosure.

In this embodiment, electrical valve heating begins by applying a voltage to the line pressure control actuator. A voltage is supplied to line pressure actuator opening coil at reference 302, and the voltage is indicated by a higher signal level. Note that the voltage applied may be in the form of a time-varying voltage or in a substantially constant (e.g., ±0.5V) so that a DC current or a time-varying current is produced, depending on the type of heating desired (e.g., resistive, hysteresis, and/or eddy current heating). Further, the duration of the applied voltage/current may be varied by transmission or engine operating conditions if desired. Current begins to increase in the line pressure actuator as soon as voltage is applied. The voltage is supplied for a predetermined duration and is then removed from the coil at the location indicated by vertical reference 308. The predetermine voltage duration may vary or be adjusted with engine or transmission operating conditions, if desired. The current decreases at reference 304 when voltage is removed from the electrically operable mechanically actuated valve. Voltage is then applied to the transmission converter control actuator at reference 306 when voltage is dropped from the line pressure actuator. Current flow increases to the transmission converter control actuator at reference 310, coincident with the application of voltage shown at the higher portion of signal TC OPNV. After the voltage is removed from the transmission converter control actuator, voltage is applied to the electrically operable mechanical actuator that supplies fluid to the $1^{st}$ gear clutch. After voltage is removed from the $1^{st}$ gear electrically operable mechanical actuator, the sequence is repeated starting again by applying voltage to the line pressure actuator. The sequence is shown being repeated eight times before the transmission is engaged at reference 310. However, the sequence may continue until it is determined that the valves are at a desired temperature, the battery is below a desired state of charge, a predetermined amount of time is exceeded, or a external signal such as a transmission engagement occurs. Also, note that the heating sequence may be longer than that which is shown. That is, the heating sequence may continue while the vehicle is being driven. Since eddy current and hysteresis heating does not require valve movement, the valves can be heated while the transmission is engaged without affecting the shift pattern or oil pressure control.

FIG. 3 also shows that the heating of the $2^{nd}$ gear electrically operable mechanically actuated valve is delayed until transmission engagement. By delaying heating of this actuator, it may be possible to increase the amount of heat transferred to other actuators. Further, since the transmission will not immediately engage $2^{nd}$ gear upon transmission engagement, the delayed heating may be accomplished without affecting transmission shifting. Accordingly, the actuators for higher gear clutches may be delayed, if desired.

FIG. 3 is merely one example of numerous possibilities that the actuator heating order may be accomplished. In other words, different electrically operable mechanical actuators can be heated in a different order than that which is shown based on individual transmission configurations, for example. Further, delaying valve heating after a drive engagement may be unnecessary in some applications, while the heating delay for some actuators may be increased in some applications.

Figure 4:
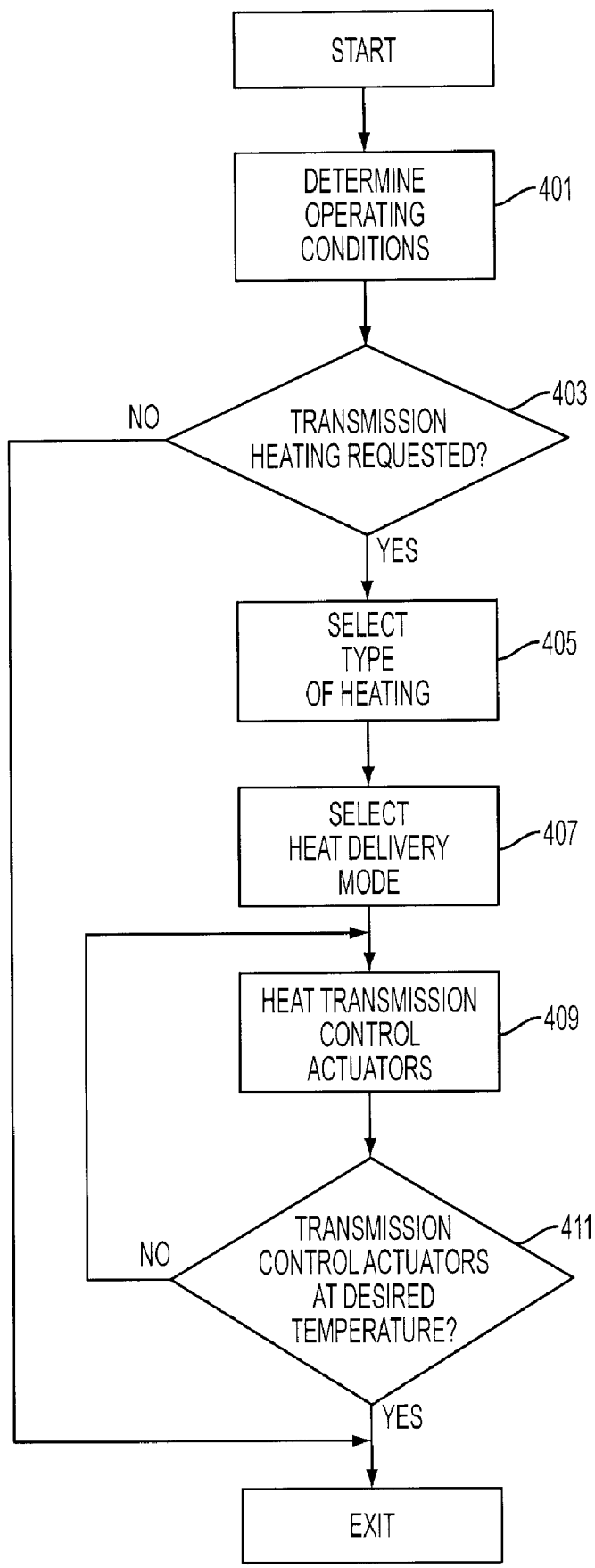
FIG. 4 is a flow chart of an example method to heat electrically actuated mechanical valves of a transmission.

Referring now to FIG. 4, in step 401, operating conditions are determined. Operating conditions are determined by inquiring into the status of sensors described in FIG. 1. That is, the output of a sensor and/or actuator is sampled and operating conditions are determined. Furthermore, sensor information can be used to infer operating conditions of unmonitored transmission conditions. In one embodiment, transmission fluid temperature and transmission output shaft speed are determined. Other embodiments may include engine sensors (not shown) and additional transmission sensors. As such, the present description is not limited to the sensors illustrated in FIG. 1, but also may include determining engine speed, time since start, engine combustion events from a start, transmission input speed, and/or engine load, for example. In addition, combinations and sub-combinations of the above variables may be determined depending on design choice. The routine proceeds to step 403.

In step 403, the routine determines if heating of an electrically operable mechanically actuated valve is desired. If so, the routine proceeds to step 405, if not the routine proceeds to exit. If heating is not desired, the valves can be supplied with current that provides typical opening and closing functionality.

The determination of whether or not to heat an electromechanical valve can be based on one or more operating conditions of a transmission, the time since the engine coupled to the transmission was last started, and/or an operator input. In one embodiment, a vehicle door opening or unlock signal and engine oil temperature can be used to determine if transmission electromechanical valve heating is desired. If transmission fluid temperature is above a predetermined level valve heating can be bypassed. To make this determination, the transmission fluid temperature can be used to index a table or function of empirically determined heating times. In one example, the desired valve heating time increases as the transmission fluid temperature decreases. And as the transmission fluid temperature approaches operating temperature the heating time goes to zero. Thus, in one embodiment, current applied to an actuator coil can be controlled to increase eddy currents, hysteresis, and/or a magnetic field when temperature decreases, and the eddy current, hysteresis, and/or magnetic field can be controlled to reduce eddy currents when the transmission fluid temperature increases. In another embodiment, transmission fluid temperature can be used to determine the valve heating duration. In still other embodiments, combinations and sub-combinations of parameters determined in step 401 can be used to determine valve heating time.

Once valve heating begins, the valves may be heated for a predetermined amount of time, until the transmission is engaged, until the transmission temperature reaches a desired level, or until valve temperature reaches a predetermined level (i.e., measured or inferred). Of course, as previously mentioned, valve heating can occur while the transmission is being operated without changing a transmission shift schedule, if desired.

In step 405, the valve heating method is selected. The electrically operable mechanically actuated valves may be heated by eddy currents, hysteresis, coil resistance, or by a combination of eddy current and resistive heating or by a combination of eddy current, hysteresis, and resistive heating.

Eddy current and hysteresis heating methods provide a way to project electrical energy away from the actuator coils. Further, the actuator coils are also heated during eddy current and hysteresis heating. That is, a time-varying current can be supplied to a coil to produce a time-varying magnetic field that induces eddy currents and hysteresis in nearby conductive components while also creating $I^2R$ losses. Eddy current heating, hysteresis heating, and the $I^2R$ losses can be adjusted by varying the current offset from zero, the current amplitude, and the current frequency.

Eddy currents generate heat when they are resisted by the conductive components. The time-varying current may be bi-polar or uni-polar and they may induced by voltage that is applied in the form of a square wave, a sine wave, or a triangle wave, for example. Note that in other embodiments, a controller may specifically control current rather than voltage. By adjusting current attributes, a magnetic field frequency and power density can be controlled to target specific areas of the surrounding conductive valve components. For example, higher frequency coil excitation current tends to concentrate eddy current at the outer surface of conductive components while lower frequencies tend to penetrate deeper into the component. By exciting the actuator coil at higher frequencies, the valve actuator armature outside surface area temperature can be increased so that the oil film that lubricates the armature is heated. Heating the transmission fluid film can decrease the fluid viscosity and lower the valve actuator friction. The current to the actuator coil can be controlled by a model that predicts component temperature, from component temperature measurement feedback, or from a combination of temperature feedback and model data. Thus, the current attributes (i.e., frequency, amplitude, duty cycle, etc.) can be adjusted to produce a time-varying magnetic field having a power density that substantially raises the temperature of an armature of an electrically operable mechanical valve in a transmission (e.g., in some applications a power density that increases the initial temperature 10% over a 10 second period; in other examples, a power density that increases the initial temperature 1° C., 5° C., or 10° C. over a 10 second period; in other applications a power density that increases the initial temperature 10% over a 20 minute interval may be desirable depending on actuator mass, ambient conditions, and control objectives). And the current attributes can be adjusted to increase the magnetic field power density at lower temperatures and to decrease the magnetic field power density at higher temperature. Consequently, eddy current heating and hysteresis heating can be controlled so that actuator heating is varied in response to transmission and/or valve operating conditions.

Hysteresis heating can result from losses that occur in magnetic materials. A time-varying magnetic field can cause magnetic dipoles in magnetic material to oscillate as the magnetic poles change orientation in response to the time-varying magnetic field. The oscillating dipoles can produce heat unless the material is heated above the Curie temperature.

Eddy current and hysteresis heating also allows the valve actuator armature to substantially remain in a position (e.g., ±0.5 mm) that the armature assumed before eddy current and/or hysteresis heating is initiated. That is, the actuator armature can be held in a position (open or closed) while heating a valve actuator by eddy currents and/or hysteresis without changing the actuator state. By supplying current at a frequency that is above the natural frequency of the mechanical system, the electrical current energy can be transformed into magnetic field energy without necessarily moving the valve actuator armature. Note that the mechanical system in some configurations can be the valve actuator, while in other systems the mechanical system can also include other associated components and springs.

Alternatively in a different embodiment, current can be supplied at a frequency having a period that is less than the transit time that it takes for an electrically operable mechanical actuator being excited to move its armature from an open to a closed position, or vise-versa, at a particular current level. For example, where a current amount at a first level moves an armature in 0.2 seconds, a current frequency greater than 5 Hz can be applied. At another condition, where a current amount at a second level moves the previously mentioned armature in 0.1 seconds, a current frequency greater than 10 Hz can be applied. By exciting the electrically operable mechanical valve with a current at a frequency above the transit time, eddy current heating and hysteresis heating can be applied without having to move the actuator armature.

On the other hand, resistance heating can increase the temperature of an actuator coil so that coil heat can be carried to surrounding components by conduction. In this heating mode, current flowing into the valve actuator coil is regulated so that the actuator coil temperature stays below a predetermined value. The coil temperature can be controlled by regulating the amount of current entering the actuator coil as well as by controlling the amount of time that current is permitted to flow into the actuator coil. Valve heating current may controlled by a model that predicts component temperature, from component temperature measurement feedback, or from a combination of temperature feedback and model data. In one embodiment of resistive coil heating, the valve actuator armature is substantially maintained in a position (i.e., ±0.5 mm) that the armature assumed prior to increasing and/or decreasing current to the electrically operable mechanical valve actuator a plurality of times. That is, the open or closed state of the actuator is maintained. For example, current may be increased and decreased a plurality of times to a transmission control valve that is in a full open or full closed position, depending on the valve configuration, without changing the state of the actuator. That is, the current can be increased above a level of holding current and then decreased to the level of holding current without changing the actuator state. In resistive heating mode some eddy current heating may take place, but a greater percentage of coil heating occurs than eddy current heating.

It may be desirable to use one heating method over another. For example, at lower temperatures it may be desirable to use primarily eddy current heating (e.g., 60% or more of the heating energy is through eddy currents) so that heating targets energy to the armature surface where transmission fluid temperature is in contact with the armature. At other conditions, it may be just as desirable to simply use resistive heating. For example, if a particular electromechanical valve design is such that heat is readily conducted from the actuator coil to an area where heat is desired, then it may be desirable to simply heat the actuator coil. In still another embodiment, it may be desirable to heat an actuator with eddy currents and then by resistive heating.

The particular desired heating method can be selected by logically evaluating operating conditions. In one embodiment, the valve heating method is determined by transmission fluid temperature and transmission output speed. If the transmission temperature and the transmission output speed are within one range, eddy current valve heating is initiated. If transmission fluid temperature and transmission speed are within a different range, resistive heating is initiated. In another embodiment, a state machine can be used to select the desired heating method. Transmission operating conditions and valve operating conditions determine a particular heating state that is initiated.

In step 407, the valve heating procedure is selected. In some embodiments, valve heating can be completed before a transmission is engaged. In another embodiment, valves may be heated before and/or after the transmission is engaged in gear. For example, as illustrated in FIG. 3, line pressure control valves are heated before the transmission is engaged into a particular gear, and the $2^{nd}$ gear electrically operable mechanical actuator clutch control valve is actuated after the transmission is engaged. In another embodiment, all transmission electrically operable mechanical actuators may be heated during a period where the transmission is not engaged. Thus, valves may be heated in a variety of ways. In one embodiment, transmission operating conditions are evaluated with logic and a particular heating method is selected. For example, in one embodiment, when a vehicle door is opened, eddy current heating may be initiated in a valve coil to reduce the valve friction in anticipation of an impending drive-away. In another embodiment, resistive heating is used when transmission fluid temperature is above a predetermined amount and eddy current heating is used when the transmission fluid temperature is below a predetermined amount. Since valve design and system construction may vary from application to application, a variety of heating selection procedures are anticipated. As such, the heating procedures mentioned are not meant to limit the description scope or breath.

In step 409, the electromechanically actuated valves are heated. One or more electrically operable mechanically actuated valves are heated by supplying current to one or more coils of an electrically operable mechanically actuated valve. The current may be supplied continuously or it may be supplied in discrete intervals. For example, it may be desirable during some conditions to supply current to one actuator coil, stop current flow to the coil, and then start current flowing to another actuator coil. Further, the frequency, power, and/or amplitude of current may be adjusted or varied with operating conditions, if desired. By supplying current to each coil sequentially, the instantaneous power consumption may be reduced. However, in other embodiments, all actuators or a group of actuators may be simultaneously heated, if desired. The routine proceeds to step 411.

In step 411, the routine decides whether or not to continue heating the electrically operated mechanically actuated transmission valves. The heating process can be stopped by the actuators reaching a desired temperature, a timer reaching a predetermined time, a condition where the vehicle charging system state is below a predetermined level, or by stopping the engine, for example. If the routine decides to continue heating, the routine proceeds to step 409. If not, the routine exits.

As will be appreciated by one of ordinary skill in the art, the routines described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features and advantages described herein, but is provided for ease of illustration and description. Although not explicitly illustrated, one of ordinary skill in the art will recognize that one or more of the illustrated steps or functions may be repeatedly performed depending on the particular strategy being used.

This concludes the description. The reading of it by those skilled in the art would bring to mind many alterations and modifications without departing from the spirit and the scope of the description. For example, I3, I4, I5, V6, V8, V10, and V12 engines operating in natural gas, gasoline, diesel, or alternative fuel configurations could use the present description to advantage.

The invention claimed is:

1. A method to improve the performance of an electrically actuated valve operable in a transmission, the method comprising:

when a temperature is within a first range, supplying a time-varying current to at least a coil of an electrically operable mechanical valve actuator that operates the valve of the transmission, said time-varying current increasing eddy currents as said temperature decreases at least while the valve is not moving and said time-varying current decreasing said eddy currents as said temperature increases at least while the valve is not moving; and when said temperature is within a second range, resistively heating the actuator coil at least while the valve is not moving.

2. The method of claim 1 wherein said temperature is a temperature of said transmission.

3. The method of claim 1 wherein said temperature is a temperature of said electrically operable mechanical valve actuator.

4. The method of claim 1 wherein said coil is an opening coil.

5. The method of claim 1 wherein said coil is a closing coil.

6. The method of claim 1 wherein said time-varying current is off-set from zero.

7. The method of claim 1 wherein said time-varying current is at a frequency above the natural frequency of said electrically operable mechanical valve actuator.

8. The method of claim 1 further comprising initiating the flow of said time-varying current in response to an operator action.

9. The method of claim 1 wherein said time-varying current is bi-polar.

10. The method of claim 1 wherein said time-varying current is uni-polar.

11. The method of claim 1 further comprising operating said transmission while applying said time-varying current.

12. A method to improve the performance of an electrically actuated valve operable in a transmission, the method comprising:

selecting from among a plurality of valve heating methods to heat the electrically actuated valve based on transmission operating conditions, the selection including:

during a first transmission operating condition, heating the valve while the valve is not moving by adjusting at least one of a frequency, power, and/or amplitude of a time-varying current supplied to at least a coil of the electrically actuated valve; and during a second transmission operating condition, heating the valve while the valve is not moving, and while the coil is energized, where additional current is supplied beyond that needed to energize the coil to resistively heat the coil.

13. The method of claim 12 wherein during the first transmission operating condition, said current is adjusted to vary eddy currents based on a temperature.

14. The method of claim 12 wherein during the first transmission operating condition, said current is adjusted to vary hysteresis losses in the valve based on a temperature.

15. The method of claim 12 wherein during at least the second transmission operating condition, said heating includes regulating an amount of said current entering the coil and controlling an amount of time that the current is permitted to flow into the coil based on a temperature.

16. The method of claim 12 wherein the selection is further based on a transmission output speed.

17. A method to improve the performance of an electrically actuated valve operable in a transmission, the method comprising:

heating the electrically actuated valve with a first heating method in a first temperature range at least while the valve is not moving, said first heating method including supplying a current to at least a coil of the valve and regulating an amount of said current entering the coil and controlling an amount of time that the current is permitted to flow into the valve coil; and heating the electrically actuated valve with a second, different, heating method in a second temperature range, said second method including supplying a time-varying current to at least the coil, said second heating method being controlled by adjusting at least one of a frequency, power, and/or amplitude of the time-varying current supplied to at least the coil of the valve, at least while the valve is not moving.

18. The method of claim 17 wherein at least one of the heating methods is commenced in response to an opening of a driver door, and where the valve actuates a clutch of the transmission.

19. The method of claim 17 wherein at least one of the heating methods is commenced in response to an opening of a driver door, and where the valve controls a pressure of fluid in the transmission.

* * * * *